(12) United States Patent
Robertson et al.

(10) Patent No.: US 6,209,100 B1
(45) Date of Patent: Mar. 27, 2001

(54) MODERATED FORUMS WITH ANONYMOUS BUT TRACEABLE CONTRIBUTIONS

(75) Inventors: Sheldon I. Robertson, Boynton Beach; Cynthia A. O'Shea, Lake Worth; Keith N. Fortenberry, Boca Raton, all of FL (US)

(73) Assignee: International Business Machines Corp., Armonk, NY (US)

( * ) Notice: Subject to any disclaimer, the term of this patent is extended or adjusted under 35 U.S.C. 154(b) by 0 days.

(21) Appl. No.: 09/049,734

(22) Filed: Mar. 27, 1998

(51) Int. Cl.[7] .................................................. G06F 11/30
(52) U.S. Cl. .............................................. 713/200; 705/74
(58) Field of Search ..................... 713/200, 201; 380/227, 282, 285; 705/74; 709/219; 455/410, 413

(56) References Cited

U.S. PATENT DOCUMENTS

| | | | |
|---|---|---|---|
| 5,420,926 | * 5/1995 | Low et al. | 380/24 |
| 5,557,518 | 9/1996 | Rosen | 364/408 |
| 5,668,878 | * 9/1997 | Brands | 380/30 |
| 5,696,827 | * 12/1997 | Brands | 380/30 |
| 5,799,151 | * 8/1998 | Hoffer | 709/204 |
| 5,812,670 | * 9/1998 | Micali | 380/25 |
| 5,884,270 | * 3/1999 | Walker et al. | 705/1 |
| 5,907,677 | * 5/1999 | Glenn et al. | 345/330 |
| 5,924,084 | * 7/1999 | Rooij | 705/39 |
| 5,961,593 | * 10/1999 | Gabber et al. | 709/219 |
| 6,026,116 | * 2/2000 | Heidemann et al. | 375/200 |

* cited by examiner

Primary Examiner—Dieu-Minh T. Le
(74) Attorney, Agent, or Firm—Akerman Senterfitt

(57) ABSTRACT

A method for moderating forums with anonymous but traceable contributions, comprising the steps of: establishing and conducting a moderated forum; receiving from any anonymous contributor an anonymous message and data identifying the contributor's actual user name and an anonymous designation; displaying the data identifying the actual user name and the anonymous designation only to at least one of a moderator and an administrator of the forum, the moderator having an opportunity to authorize or refuse publication of the anonymous message in accordance with rules of the forum and the at least one of the moderator and the administrator having an opportunity to attribute authorship of the anonymous message to the user for further reference; and, upon authorization of publication, publishing the anonymous message to the forum anonymously as to all other contributors.

12 Claims, 3 Drawing Sheets

FIG. 1

MODERATED FORUMS WITH ANONYMOUS BUT TRACEABLE CONTRIBUTIONS

BACKGROUND OF THE INVENTION

1. Field of the Invention

This invention relates generally to the field of managing moderated forums on the Internet and/or the world wide web (WWW), and in particular, to a method providing for anonymous, but moderator-traceable contributions to such moderated forums.

2. Glossary of Terms and Trademark Notices

An administrator is a person who sets up and maintains forums.

Asynchronous refers to an event or sequence of events which do not occur in real time.

An authenticated user is an Internet discussion forum participant or contributor whose identity has been verified by entry of a password, which was previously assigned when the user was registered for the discussion forum.

A forum is an asynchronous Internet discussion.

A moderator is a subject-matter expert appointed to monitor the messages being posted to a particular forum.

A moderated forum is a forum for which the publication of messages is dependent on a moderator.

A newsgroup is a synonym for forum which is usually used to describe discussions found in the USENET portion of the Internet hierarchy.

To publish or post a forum message is to have the message included in a forum.

Registration is the process of assigning a user identification (userID) and password to a new user of a particular Internet service after the user has supplied the necessary information, for example name, e-mail address and the like. Users are either registered automatically by a program set up to handle such requests, or by the service administrator manually adding their information to the user database for the service.

HealthVillage and Lotus Notes Domino are registered trademarks of IBM Corporation. WebBoard is a registered trademark of O'Reilly & Associates, Inc. Netscape and Netscape Navigator are registered trademarks of Netscape Communications.

3. Description of Related Art

Asynchronous discussions have long been in existence on the Internet, particularly implemented in the newsgroups found within the USENET hierarchy. Newsgroups tend to focus on a particular area of interest (for example, rec.music.beatles is a newsgroup in the recreation section of the USENET hierarchy for music fans of the Beatles). Participants in these Internet newsgroups submit messages to the newsgroup, as new topics for discussion (for example, "I think the White Album is brilliant!"), as responses to previously submitted topics (for example, "I agree with you!") or as responses to responses (for example, "Me too!").

USENET newsgroups are meant to be a free benefit to the Internet community, so access to USENET newsgroups is open to any Internet user. Accordingly, no user registration takes place prior to participation. This openness can be detrimental to these newsgroups, however, as mischievous or inconsiderate users can deluge newsgroups with messages inappropriate due to language, subject matter, purpose and the like. While USENET newsgroups have general and group-specific rules for participation, enforcement of these rules is difficult since the lack of authentication of participants allows problem users to falsify logon names and e-mail address information at any time. Certain designated USENET newsgroups are actually moderated, that is, messages are read and approved by a moderator prior to being posted to the newsgroup. A moderator's job can be made much more difficult by an unknown participant repeatedly submitting inappropriate messages to such a newsgroup.

Forums for registered participants, such as those offered by Internet-based services, for example a Web site for Lotus Notes support, have fewer problems with users failing to observe the rules, since "repeat offenders" can always have their registrations revoked by the forum's administrator. These types of discussions usually require authentication of users, contributors or participants, these terms being used herein interchangeably, if not for reading the forum's messages, then certainly for composing messages to submit to the forum. Once authenticated, the contributor's identity is known to the system and appears on every message submitted by this contributor, so anonymous posting is precluded by this scheme. As useful as this might be to the forum moderators and administrators, it could prove to be a damper for discussions on sensitive topics (for example, substance abuse and AIDS), where a contributor may wish for anonymity for legitimate reasons of privacy, as opposed to providing a cover for causing mischief.

In a moderated forum package such as O'Reilly's Web-Board application anonymity is possible for such a discussion newsgroup by employing a false userID, but this renders the user untraceable to the moderator of such a group. WebBoard therefore allows for anonymous authors, or contributors, but moderators of these forums are unable to trace anonymous problem-users.

The problem therefore is how to balance the legitimate need some contributors can have for anonymity with the moderators' need to be able to carry out their duties and maintain order in a particular forum. There is a long-felt, but unsatisfied need for a methodology for Internet forum contributors to post messages to a moderated forum in such a way that the identity of the forum contributor is hidden from readers of the anonymous contributor's messages, but at the same time, is known to the moderator.

SUMMARY OF INVENTION

When a contributor is composing a new message for a moderated discussion in accordance with the inventive arrangements, the contributor is given a choice of attributing authorship of the message to either the contributor's actual user name or to "Anonymous". The contributor's actual user name would be known to the system because the contributor had to authenticate his or her identity prior to accessing the forum or discussion. If the contributor chose to be listed as "Anonymous" in this message, the actual user name would be stored as a variable whose value would only be displayed to the moderators of the forum. Since ordinary contributors would be unable to see this display of the contributor's actual user name, the contributor's goal of anonymity is achieved without sacrificing the benefits of a moderated forum and without increasing the difficulty of moderating the forum.

A method for moderating forums with anonymous but traceable contributions, in accordance with an inventive arrangement, comprises the steps of: establishing and conducting a moderated forum; receiving from any anonymous contributor an anonymous message and data identifying the contributor's actual user name and an anonymous designation; displaying the data identifying the actual user name and the anonymous designation only to at least one of a moderator and an administrator of the forum, the moderator having an opportunity to authorize or refuse publication of the anonymous message in accordance with rules of the forum and the at least one of the moderator and the administrator having an opportunity to attribute authorship of the anonymous message to the user for further reference; and, upon authorization of publication, publishing the anonymous message to the forum anonymously as to all other contributors.

The data identifying the actual user name and the anonymous designation can be displayed only to the administrator, only to the moderator or to both the moderator and the administrator.

The attributed and anonymous messages can be user generated by a method comprising the steps of: including in a message data representing the actual user name; including in the posted message data representing the request for attributed or anonymous authorship of the message; in the event attributed authorship is requested, transmitting with the message only the data representing the actual user name; and, in the event anonymous authorship is requested, transmitting both the data representing the actual user name and the data representing the request for the anonymous authorship.

A method for posting attributed and anonymous messages to a moderated forum, in accordance with another inventive arrangement, comprises the steps of: including in a message data representing an actual user name; including in the message data representing a request for attributed or anonymous authorship of the message; in the event attributed authorship is requested, transmitting with the message only the data representing the actual user name; and, in the event anonymous authorship is requested, transmitting both the data representing the actual user name and the data representing the request for the anonymous authorship, whereby at least one of a moderator and an administrator of said forum has access to said data representing said actual user name and said data representing said request for said anonymous authorship, said moderator has an opportunity to authorize or refuse publication of said anonymous message in accordance with rules of said forum, said at least one of said moderator and said administrator has an opportunity to attribute authorship of said anonymous message to said user for further reference, and in the event publication of said anonymous message is authorized, said moderator can publish said anonymous message to said forum anonymously as to all other forum contributors.

The posting method can further comprise the step of displaying the data representing the actual user name and the anonymous designation only to the administrator, only to the moderator or to both the moderator and the administrator.

DETAILED DESCRIPTION OF THE PREFERRED EMBODIMENTS

Figure 1:
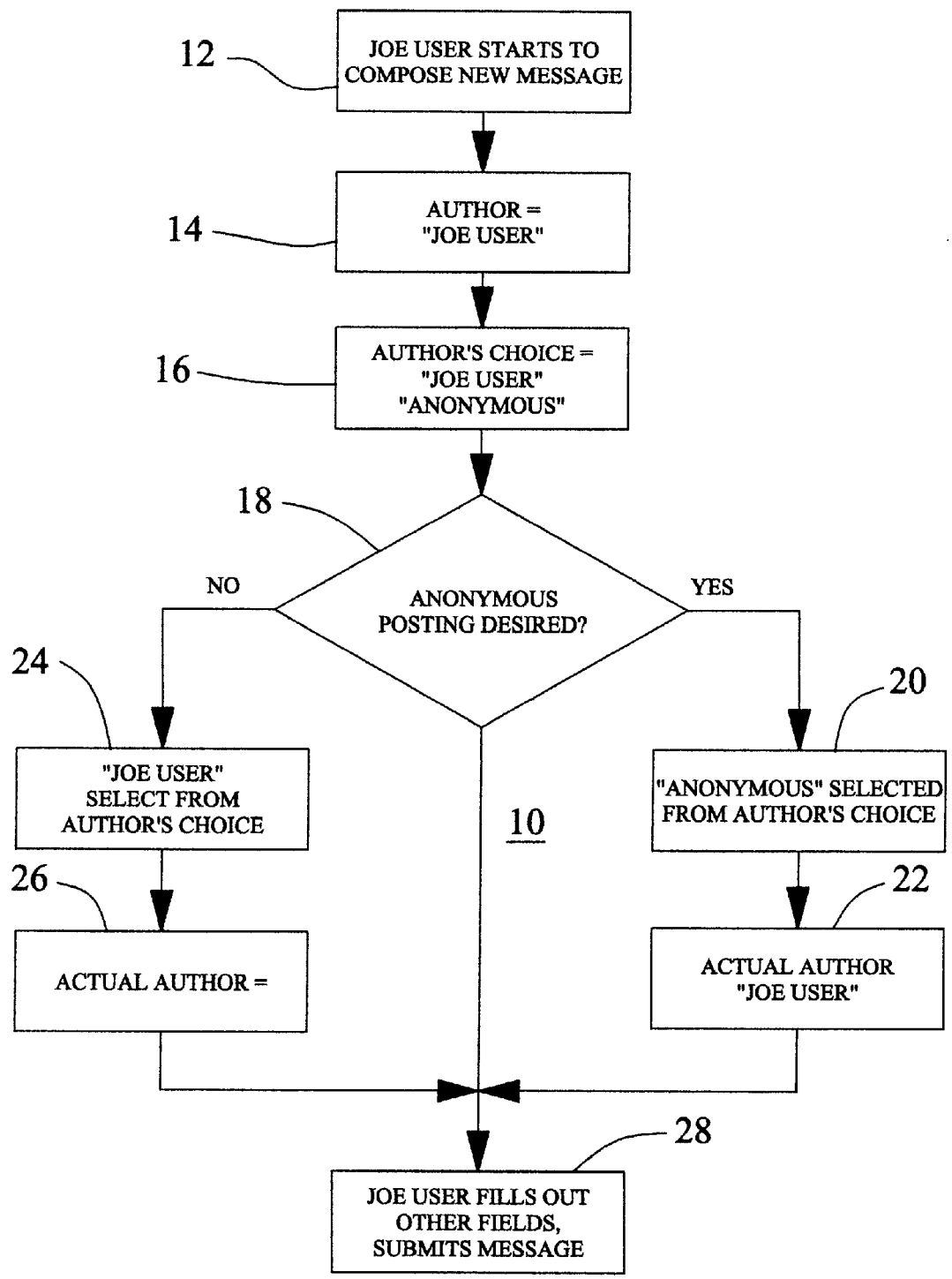
FIG. 1 is a flow chart useful for explaining the method of composing an anonymous, new message in accordance with the inventive arrangements.

A methodology for operating a moderated forum generally involves four significant aspects, whether or not any of the participants are anonymous to other participants and/or the moderator.

A first aspect is a moderated forum to which messages are posted by participants for other participants to read.

A second aspect is a group of participants who read messages posted to the forum by other participants and post messages of their own. Prior to accessing the forum, a participant's identity is authenticated by entry of a password.

A third aspect is a message template employed by the participants to compose messages to the forum. This template usually contains a field called Message Status (MsgStatus) is indicating what action the forum moderator has taken concerning this message. This field can have one of the following three values: 1.) pending, meaning that the moderator has yet to review this message, so it has not yet been published to the forum; 2.) approved, meaning that the moderator has reviewed and approved this message for publication on the forum, and this message is now visible to the other users of the forum; and, 3.) rejected, meaning that the moderator has reviewed and rejected this message, and this message will never be seen by the other forum participants. The initial value of this field for all messages is pending. This initial value can only be changed by a moderator for this forum.

A fourth aspect is a moderator to decide whether a message submitted by a participant to a particular moderated forum is suitable for publication on that forum. Messages are not seen by other participants until the moderator has approved them. Messages rejected by the moderator are never seen by other participants. The moderator's job can be facilitated by some sort of content filtering tool, that is, a programmable utility that would automatically flag messages containing inappropriate language and the like.

A fifth aspect is an administrator who sets up and maintains a particular moderated forum, including setting up and maintaining an access list for that forum with the names of all of its participants. Part of the administrator's duties are to remove any one from the access list that the moderator believes was being disruptive to the purpose of the forum.

All of the foregoing aspects can be referred to collectively, and generally, as establishing and conducting a moderated forum. In order to establish and conduct a moderated forum which enables participants to be anonymous to other participants but not to moderators, the general method must be modified in accordance with the inventive arrangements to provide for generating the following data and enabling the following logical selections.

The first additional data or information which must be generated is an Author field. The Author field is a field hidden in the message being posted by the participant to the moderated forum. This field is always set to the user name or userID for the author of the current message. The user name of the author would be known to the forum since the user must authenticate the user's identity prior to composing a new message.

The second additional data or information which must be generated is an AuthorChoice list. The AuthorChoice list is a mechanism allowing the user to select how the author of this message should be displayed, that is, either the user's actual name or "Anonymous" would be used. This mechanism could be implemented as a drop-down list or a set of radio buttons.

The third additional data or information which must be generated is the ActualAuthor field. The ActualAuthor field displays the actual user name of the message's author for the case where the user submitted the message to the forum anonymously. This field is a display-only version of the Author field.

In accordance with different embodiments, the ActualAuthor field is visible only to the moderator(s), only to the administrator(s) or to both the moderator(s) and administrator(s) of the forum. In each embodiment, the moderator has an opportunity to authorize or refuse publication of the anonymous message in accordance with rules of the forum. Generally speaking, whether or not the moderator is the party to whom the real identity of the user is known, it is still the moderator's responsibility to approve or refuse publication. Depending on the embodiment, one or both of the moderator and the administrator has an opportunity to attribute authorship of the anonymous message to the user for further reference. In the event publication of the anonymous message is authorized, the moderator can publish the anonymous message to the forum anonymously as to all other forum contributors.

The fourth additional data or information which must be generated is the UserType. The UserType is a mechanism to distinguish between different types of users of the forum, that is, distinguishing between the normal users and moderator(s) and administrator(s) of the forum, so that forum messages can be presented differently to each type of user.

A method for anonymously posting a message to a moderated forum, which can be moderated despite the anonymous contribution, is illustrated in FIG. 1. This flowchart 10 shows what values are assigned to the data elements explained above, depending on whether or not the User wishes to have this new message attributed to the User's actual name or to "Anonymous".

The process begins with a User accessing the forum deciding to contribute a message to the forum. The user can do so by clicking on a "Compose A New Message" button to bring up a new message form, in accordance with the step represented by block 12, for example on a web browser screen such as that shown in FIG. 2. The Author field in this form is immediately set to the user's actual name (in this case, "User") in accordance with the step represented by block 14. The AuthorChoice list is then assigned the values "User" and "Anonymous" in accordance with e step represented by block 16.

User decides whether to post this message anonymously or have it attributed to User's actual name in accordance with the step represented by decision block 18. If User wants to do an anonymous posting then "Anonymous" is selected from the AuthorChoice list and the method branches to block 20. The ActualAuthor field is assigned the value of Author ("User") in accordance with the step represented by block 22 if "Anonymous" is selected from the AuthorChoice list. If User does not want to do an anonymous posting then "User" is selected from the AuthorChoice list and the method branches to block 24. The ActualAuthor list remains an empty string in accordance with the step represented by block 26.

Each of blocks 22 and 26 leads to the step represented by block 28, in accordance with which User composes the body of the message and submits the message to the forum for publication, pending the approval of the forum moderator. The moderator reviewing User's message will always be aware of who the actual author of this message is, since unlike a regular user, the ActualAuthor field would be displayed to the moderator if User chose to post this message anonymously.

Figure 2:
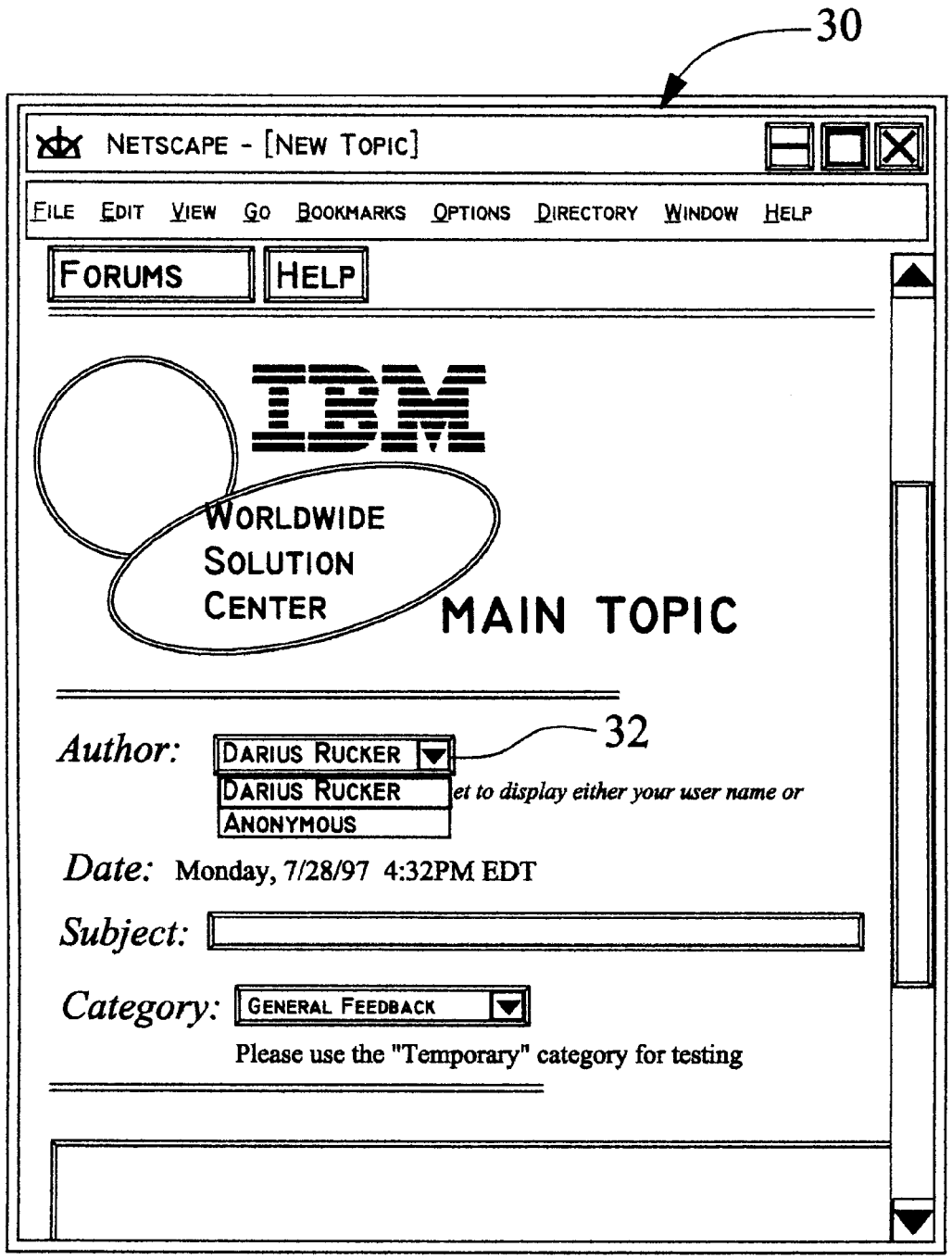
FIG. 2 is a partial view of a New Message window screen or form in accordance with the inventive arrangements.
Figure 3:
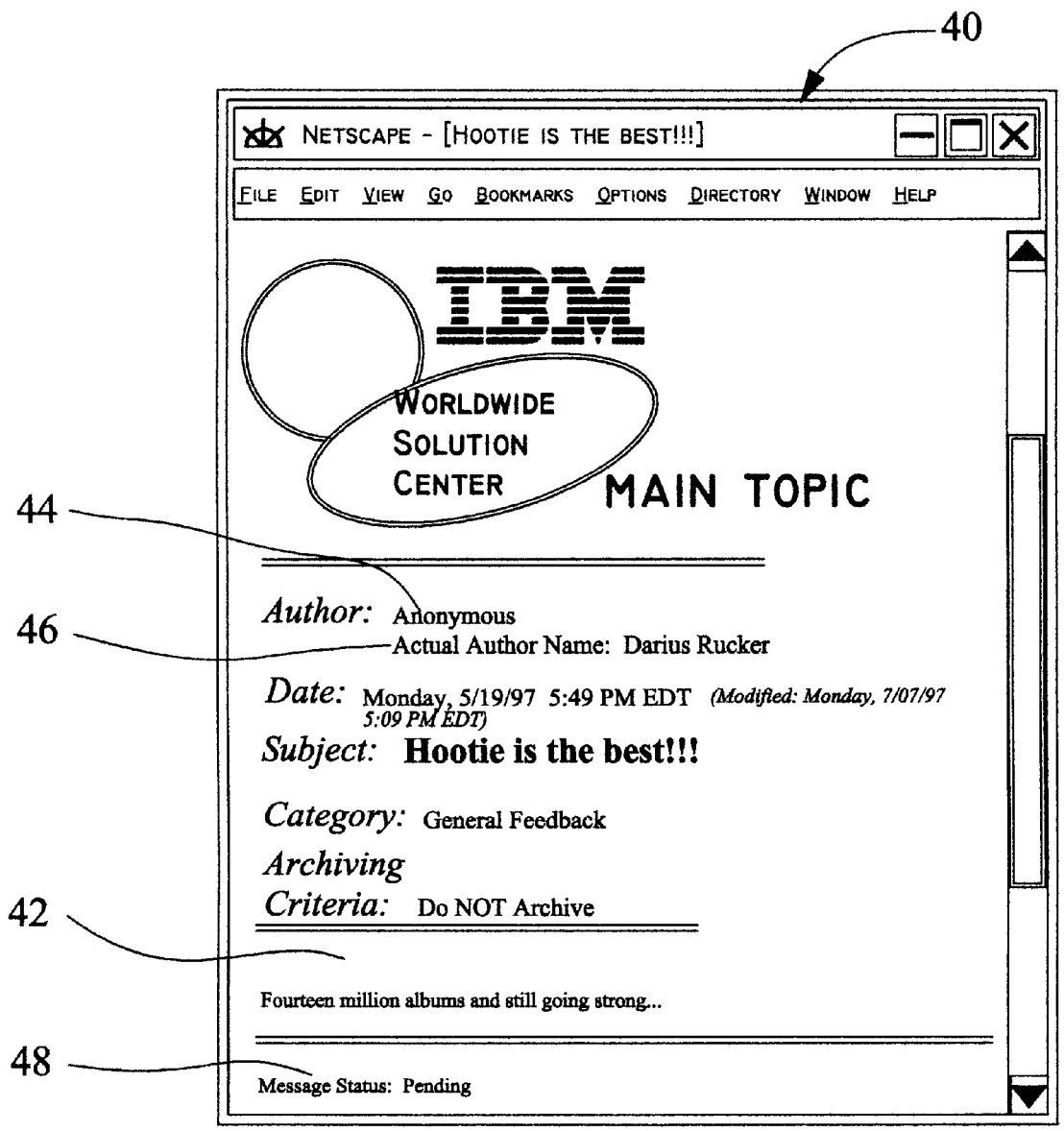
FIG. 3 is a partial view of a moderator's view of an anonymous message in accordance with the inventive arrangements.

FIGS. 2 and 3 illustrate how these data elements are used in a Lotus Notes Domino implementation. FIG. 2 shows a partial view of the window or form 30 used to compose a new message, as displayed in a World Wide Web browser, for example Netscape Navigator. The AuthorChoice list is shown as a drop-down listbox 32 containing the value of Author ("Darius Rucker") and "Anonymous". The default selection from this list is the author's actual name, namely Darius Rucker.

FIG. 3 shows a partial view of a message window 40 as it appears to the moderator reviewing the message 42. The user has chosen to be an anonymous author of this message, and is so identified as "Anonymous" at 44; yet the moderator is still aware of the user's identity because the value of ActualAuthor is displayed beneath the "Author:" line in this message at 46. Only the moderator can see the value of ActualAuthor, as this line is programmed to display only to users for whom the UserType variable is "Moderator". The message status is pending, as indicated at 48, until the moderator has approved or refused publication.

What is claimed is:

1. A method for moderating forums with anonymous but traceable contributions, comprising the steps of:

establishing and conducting a moderated forum;

receiving from any anonymous contributor an anonymous post and data identifying said contributor's actual user name and an anonymous designation;

displaying said data identifying said actual user name and said anonymous designation only to at least one of a moderator and an administrator of said forum, said moderator having an opportunity to authorize or refuse publication of said anonymous post in accordance with rules of the forum and said at least one of said moderator and said administrator having an opportunity to attribute authorship of said anonymous post to said user for further reference; and, upon authorization of publication, publishing said anonymous post to said forum anonymously as to all other contributors.

2. The method of claim 1, wherein said data identifying said actual user name and said anonymous designation is displayed only to said administrator.

3. The method of claim 1, wherein said data identifying said actual user name and said anonymous designation is displayed only to said moderator.

4. The method of claim 1, wherein said data identifying said actual user name and said anonymous designation is displayed to both said moderator and said administrator.

5. The method of claim 1, wherein said attributed and anonymous posts are user generated by a method comprising the steps of:

including in a post data representing said actual user name;

including in said post data representing said request for attributed or anonymous authorship of said post;

in the event attributed authorship is requested, transmitting with said post only said data representing said actual user name; and, in the event anonymous authorship is requested, transmitting both said data representing said actual user name and said data representing said request for said anonymous authorship.

6. The method of claim 2, wherein said attributed and anonymous posts are user generated by a method comprising the steps of:

including in a post data representing said actual user name;

including in said post data representing said request for attributed or anonymous authorship of said post;

in the event attributed authorship is requested, transmitting with said post only said data representing said actual user name; and, in the event anonymous authorship is requested, transmitting both said data representing said actual user name and said data representing said request for said anonymous authorship.

7. The method of claim 3, wherein said attributed and anonymous posts are user generated by a method comprising the steps of:

including in a post data representing said actual user name;

including in said post data representing said request for attributed or anonymous authorship of said post;

in the event attributed authorship is requested, transmitting with said post only said data representing said actual user name; and, in the event anonymous authorship is requested, transmitting both said data representing said actual user name and said data representing said request for said anonymous authorship.

8. The method of claim 4, wherein said attributed and anonymous posts are user generated by a method comprising the steps of:

including in a post data representing said actual user name;

including in said post data representing said request for attributed or anonymous authorship of said post;

in the event attributed authorship is requested, transmitting with said post only said data representing said actual user name; and, in the event anonymous authorship is requested, transmitting both said data representing said actual user name and said data representing said request for said anonymous authorship.

9. A method for posting attributed and anonymous postings to a moderated forum, comprising the steps of:

including in a post data representing an actual user name;

including in said post data representing a request for attributed or anonymous authorship of said message;

in the event attributed authorship is requested, transmitting with said post only said data representing said actual user name; and, in the event anonymous authorship is requested, transmitting both said data representing said actual user name and said data representing said request for said anonymous authorship, whereby at least one of a moderator and an administrator of said forum has access to said data representing said actual user name and said data representing said request for said anonymous authorship, said moderator has an opportunity to authorize or refuse publication of said anonymous post in accordance with rules of said forum, said at least one of said moderator and said administrator has an opportunity to attribute authorship of said anonymous post to said user for further reference, and in the event publication of said anonymous post is authorized, said moderator can publish said anonymous post to said forum anonymously as to all other forum contributors.

10. The method of claim 9, further comprising the step of displaying said data representing said actual user name and said anonymous designation only to said administrator.

11. The method of claim 9, further comprising the step of displaying said data representing said actual user name and said anonymous designation only to said moderator.

12. The method of claim 9, further comprising the step of displaying said data representing said actual user name and said anonymous designation to both said moderator and said administrator.

* * * * *